(12) United States Patent
Liu et al.

(10) Patent No.: US 12,460,138 B2
(45) Date of Patent: *Nov. 4, 2025

(54) BLEND OF WASTE PLASTIC WITH BIO FEED AND PROCESS OF PREPARATION

(71) Applicant: Chevron U.S.A. Inc., San Ramon, CA (US)

(72) Inventors: Tengfei Liu, San Ramon, CA (US); Joel E Schmidt, San Ramon, CA (US); Hye-Kyung C. Timken, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 18/349,276

(22) Filed: Jul. 10, 2023

(65) Prior Publication Data

US 2024/0010927 A1  Jan. 11, 2024

Related U.S. Application Data

(60) Provisional application No. 63/359,546, filed on Jul. 8, 2022.

(51) Int. Cl.
C10G 11/05 (2006.01)

(52) U.S. Cl.
CPC ...... *C10G 11/05* (2013.01); *C10G 2300/1003* (2013.01); *C10G 2300/1014* (2013.01); *C10G 2300/1018* (2013.01); *C10G 2300/305* (2013.01); *C10G 2300/708* (2013.01); *C10G 2400/02* (2013.01); *C10G 2400/20* (2013.01); *C10G 2400/30* (2013.01)

(58) Field of Classification Search
None
See application file for complete search history.

(56) References Cited

U.S. PATENT DOCUMENTS 3,845,157 A  10/1974  Woo
4,642,401 A   2/1987  Coenen et al.
(Continued)

FOREIGN PATENT DOCUMENTS

CN  112300824 B  2/2022
EP  0 620 264 A2  10/1994
(Continued)

OTHER PUBLICATIONS

International Preliminary Report on Patentability issued in related International Patent Application No. PCT/US2023/016869, Sep. 24, 2024.
(Continued)

*Primary Examiner* — Tam M Nguyen
(74) *Attorney, Agent, or Firm* — E. Joseph Gess; Melissa M. Hayworth; Terrence M. Flaherty

(57) ABSTRACT

Provided is a composition comprising a blend of a waste plastic and a bio feedstock. Also provided is a process for preparing a stable blend of a plastic and bio feedstock which can be stored or transported if desired. The amount of plastic in the blend comprises no more than 20 wt. % of the blend. The blend can be passed to a conversion unit for conversion of the waste plastic and bio feedstock. The conversion process produces clean monomers for polymerization and chemical intermediates.

24 Claims, 6 Drawing Sheets

Preparation of a Hot Homogeneous Blend of Plastic and Bio Feedstock for Direct Conversion of Plastic Waste in Conversion Units

(56) References Cited

U.S. PATENT DOCUMENTS

| | | | |
|---|---|---|---|
| 5,849,964 | A | 12/1998 | Holighaus et al. |
| 6,143,940 | A | 11/2000 | Miller et al. |
| 6,150,577 | A | 11/2000 | Miller et al. |
| 6,288,296 | B1 | 9/2001 | Miller et al. |
| 6,822,126 | B2 | 11/2004 | Miller |
| 7,834,226 | B2 | 11/2010 | Miller |
| 8,088,961 | B2 | 1/2012 | Miller |
| 8,404,912 | B1 | 3/2013 | Miller |
| 8,696,994 | B2 | 4/2014 | Miller |
| 9,920,255 | B2 * | 3/2018 | Hofer ................ C08J 11/12 |
| 2008/0035528 | A1 * | 2/2008 | Marker ................ C07C 4/04 |
| | | | 208/113 |
| 2014/0135542 | A1 | 5/2014 | Liang et al. |
| 2014/0137464 | A1 | 5/2014 | Wells et al. |
| 2016/0264885 | A1 | 9/2016 | Narayanaswamy et al. |
| 2016/0362609 | A1 | 12/2016 | Ward et al. |
| 2018/0201847 | A1 | 7/2018 | Kohli et al. |
| 2018/0371325 | A1 * | 12/2018 | Streiff ................ C10G 11/187 |
| 2019/0161683 | A1 | 5/2019 | Narayanaswamy et al. |
| 2020/0172716 | A1 | 6/2020 | Pehlert et al. |
| 2021/0087473 | A1 | 3/2021 | Pradeep et al. |
| 2021/0130699 | A1 | 5/2021 | Bitting et al. |
| 2021/0189250 | A1 | 6/2021 | Timken |
| 2021/0189252 | A1 | 6/2021 | Timken |
| 2021/0189254 | A1 | 6/2021 | Timken |
| 2021/0332300 | A1 | 10/2021 | Timken |
| 2022/0041940 | A1 | 2/2022 | Pradeep et al. |
| 2023/0312863 | A1 | 10/2023 | Timken et al. |

FOREIGN PATENT DOCUMENTS

| | | |
|---|---|---|
| EP | 1 707 614 A | 4/2006 |
| EP | 3 878 926 A1 | 9/2021 |
| JP | 2007-145912 A | 6/2007 |
| JP | 2010-70684 A | 4/2010 |
| WO | 2013/169367 A1 | 11/2013 |
| WO | 2022/119404 A1 | 6/2022 |

OTHER PUBLICATIONS

International Search Report and Written Opinion issued in related International Patent Application No. PCT/US2023/016853, Jul. 11, 2023.

International Preliminary Report on Patentability issued in related International Patent Application No. PCT/US2023/016853, Sep. 24, 2024.

International Search Report and Written Opinion issued in related International Patent Application No. PCT/US2023/016833, Jun. 30, 2023.

International Preliminary Report on Patentability issued in related International Patent Application No. PCT/US2023/016833, Sep. 24, 2024.

International Search Report and Written Opinion issued in related International Patent Application No. PCT/US2023/016839, Jul. 5, 2023.

International Preliminary Report on Patentability issued in related International Patent Application No. PCT/US2023/016839, Sep. 24, 2024.

International Search Report and Written Opinion issued in related International Patent Application No. PCT/US2023/016850, Jul. 3, 2023.

International Preliminary Report on Patentability issued in corresponding International Patent Application No. PCT/US2023/016850, Sep. 24, 2024.

International Search Report and Written Opinion issued in related International Patent Application No. PCT/US2023/016857, Jul. 20, 2023.

International Preliminary Report on Patentability issued in related International Patent Application No. PCT/US2023/016857, Sep. 24, 2024.

International Search Report and Written Opinion issued in related International Patent Application No. PCT/US2023/016862, Jul. 11, 2023.

International Preliminary Report on Patentability issued in related International Patent Application No. PCT/US2023/016862, Sep. 24, 2024.

International Search Report and Written Opinion issued in related International Patent Application No. PCT/US2023/016869, Jul. 20, 2023.

International Search Report and Written Opinion issued in related International Patent Application No. PCT/US2023/079864, Nov. 14, 2023.

International Search Report and Written Opinion issued in related International Patent Application No. PCT/US2023/069871, Nov. 14, 2023.

International Search Report and Written Opinion issued in related International Patent Application No. PCT/US2023/069874, Nov. 16, 2023.

International Search Report and Written Opinion issued in related International Patent Application No. PCT/US2023/069876, Nov. 16, 2023.

International Search Report and Written Opinion issued in related International Patent Application No. PCT/US2023/069881, Nov. 16, 2023.

Jayeeta Chattopadhyay et al.; Catalytic co-pyrolysis of paper biomass and plastic mixtures (HOPE (high density polyethylene), PP (polypropylene) and PET (polyethylene terephthalate)) and product analysis; Chattopadhyay et al./Energy 103 (2016) 513-521.

International Search Report and Written Opinion issued in corresponding International Patent Application No. PCT/US2023/069862, Jan. 18, 2024.

* cited by examiner

Preparation of a Hot Homogeneous Blend of Plastic and Bio Feedstock for Direct Conversion of Plastic Waste in Conversion Units Stable Blend Preparation Unit Details Plastic Type Classification for Waste Plastics Recycling Circular Economy for Plastic Waste to Polyethylene via Co-Feeding of Plastic/Bio Oil Blend Through Oil Refinery FCC Unit Thermal Stability of Polyethylene and Polypropylene by Thermal Gravimetric Analysis

BLEND OF WASTE PLASTIC WITH BIO FEED AND PROCESS OF PREPARATION

CROSS REFERENCE TO RELATED APPLICATIONS

The present application claims priority to U.S. Provisional Application No. 63/359,546 filed Jul. 8, 2022, the complete disclosure of which is incorporated herein by reference in its entirety.

BACKGROUND

As part of efforts to reduce global warming, the industry is experiencing a rapid increase of chemicals and fuels production from renewable sources such as bio feedstocks or bio oils. With increasing demand for liquid transportation fuels, decreasing reserves of 'easy oil' (crude petroleum oil that can be accessed and recovered easily) and increasing constraints on the carbon footprints of such fuels, it is becoming increasingly important to develop routes to produce liquid transportation fuels from alternative sources in an efficient manner. Biomass-based feedstocks such as feedstocks containing triglycerides (e.g., fats and/or oils of plant, animal and/or microbial origin) are important feedstocks for non-fossil fuel derived sources of energy, due to their availability on a large scale. Biomass offers a source of renewable carbon. Despite the ongoing research and development of processes for the manufacture of liquid fuels, there is still a need to provide an improved process for producing low carbon footprint hydrocarbons useful as liquid fuels or fuel blending components.

On the other hand, the world has seen extremely rapid growth of plastics production. According to Plastics Europe Market Research Group, the world plastics production was 335 million tons in 2016, 348 million tons in 2017, 359 million tons in 2018, and 367 million tons in 2020. According to McKinsey & Company, the global plastics-waste volume is estimated to be 460 million tons per year by 2030 if the current trajectory continues.

Single use plastic waste has become an increasingly important environmental issue. At the moment, there appear to be few options for recycling polyethylene and polypropylene waste plastics to value-added chemical and fuel products. Currently, only a small amount of polyethylene and polypropylene is recycled via chemical recycling, where recycled and cleaned polymer pellets are pyrolyzed in a pyrolysis unit to make fuels (naphtha, diesel), stream cracker feed or slack wax. The majority, greater than 80%, is incinerated, land filled or discarded.

The current method of chemical recycling via pyrolysis cannot make a big impact for the plastics industry. The current pyrolysis operation produces poor quality fuel components (naphtha and diesel range products), but the quantity is small enough that these products can be blended into fuel supplies. However, this simple blending cannot continue if very large volumes of waste polyethylene and polypropylene are to be recycled to address environmental issues. The products as produced from a pyrolysis unit are of too poor quality to be blended in large amounts in transportation fuels.

Processes are known which convert waste plastic into hydrocarbon lubricants. For example, U.S. Pat. No. 3,845,157 discloses cracking of waste or virgin polyolefins to form gaseous products such as ethylene/olefin copolymers which are further processed to produce synthetic hydrocarbon lubricants. U.S. Pat. No. 4,642,401 discloses the production of liquid hydrocarbons by heating pulverized polyolefin waste at temperatures of 150-500° C. and pressures of 20-300 bars. U.S. Pat. No. 5,849,964 discloses a process in which waste plastic materials are depolymerized into a volatile phase and a liquid phase. The volatile phase is separated into a gaseous phase and a condensate. The liquid phase, the condensate and the gaseous phase are refined into liquid fuel components using standard refining techniques. U.S. Pat. No. 6,143,940 discloses a procedure for converting waste plastics into heavy wax compositions. U.S. Pat. No. 6,150,577 discloses a process of converting waste plastics into lubricating oils. EP0620264 discloses a process for producing lubricating oils from waste or virgin polyolefins by thermally cracking the waste in a fluidized bed to form a waxy product, optionally using a hydrotreatment, then catalytically isomerizing and fractionating to recover a lubricating oil.

Other documents which relate to processes for converting waste plastic into lubricating oils include U.S. Pat. Nos. 6,288,296; 6,774,272; 6,822,126; 7,834,226; 8,088,961; 8,404,912 and 8,696,994; and U.S. Patent Application Publication Nos. 2021/0130699; 2019/0161683; 2016/0362609; and 2016/0264885. The foregoing patent documents are incorporated herein by reference in their entirety.

Globally, recycling or upcycling of plastic waste has gained great interest to save resources and the environment. Mechanical recycling of plastic waste is rather limited due to different types, properties, additives, and contaminants in the collected plastics. Usually, the recycled plastics are of degraded quality. Chemical recycling to the starting material or value-added chemicals has emerged as a more desirous route.

However, in order to achieve chemical recycling of single use plastics in an industrially significant quantity to reduce its environmental impact, more robust processes are needed. The improved processes should establish "circular economy" for the waste polyethylene and polypropylene plastics where the spent waste plastics are recycled effectively back as starting materials for the polymers or value-added chemicals or fuels. The establishment of such a circular economy while also employing renewable sources such as bio based feedstocks would even further enhance the environmental benefits of such a recycling process.

SUMMARY

In one embodiment, provided is a composition of a blend of a waste plastic and a bio based feedstock for conversion of the waste plastic in a conversion unit, e.g., a refinery process unit.

In one embodiment, provided is an integrated process for recycling plastic waste wherein waste plastic and a bio based (bio) feedstock are simultaneously converted in a conversion unit. The conversion process produces clean monomers for polymerization and aromatic chemical intermediates.

In one embodiment, provided is a process to prepare a blend of a waste plastic and a bio feedstock (or combination of bio feedstocks) for direct conversion of waste plastic in a catalytic process unit for simultaneous conversion of the bio feedstock and waste plastics.

In another embodiment, provided is a process for preparing a stable blend of waste plastic and bio feedstock for storage, transportation or feeding to a conversion unit. The process comprises first selecting waste plastics containing polyethylene, polypropylene and polystyrene. These waste plastics are then passed through a blend preparation unit to make a stable blend of waste plastic and bio feedstock. The stable blend can ultimately be fed to a conversion unit for direct conversion of waste plastic and bio feedstock to value-added chemicals and fuels.

The term "bio" refers to biochemical and/or natural chemicals found in nature. Thus, a bio feedstock or bio oil would comprise such natural chemicals. The preferred starting bio feedstocks for the blend preparation include triglycerides and fatty acids, plant-derived oils such as palm oil, canola oil, corn oil, and soybean oil, as well as animal-derived fats and oils such as tallow, lard, schmaltz (e.g., chicken fat), and fish oil, and mixtures of these.

Among other factors, it has been found that a blend of waste plastic and a bio feedstock can be prepared, this blend can be made stable enough to be stored or transported if desired. Further, the blend can then be converted in a conversion unit to value-added chemicals and fuels. The use of a bio feedstock together with the waste plastic greatly enhances the environmental aspects of the conversion process. By further having the conversion unit part of a refinery operation, one can efficiently and effectively recycle plastic waste while also complementing the operation of a refinery in the preparation of higher value products such as gasoline, jet fuel, base oil and diesel. But also, by adding refinery operations it has been found that clean LPG (propane, propylene, butanes, and butenes) and naphtha can be efficiently and effectively produced from the blend of bio feedstock the waste plastics for ultimate polyethylene and/or polypropylene polymer production. Positive economics are realized for the overall process from recycled plastics to a polymer product with product quality identical to that of virgin polymer, while also enhancing the environmental aspects of the recycle process by employing a blend of a bio feedstock and waste plastic. The use of the present blend also saves energy and is more environmentally friendly than prior recycling processes.

DETAILED DESCRIPTION

Figure 1:
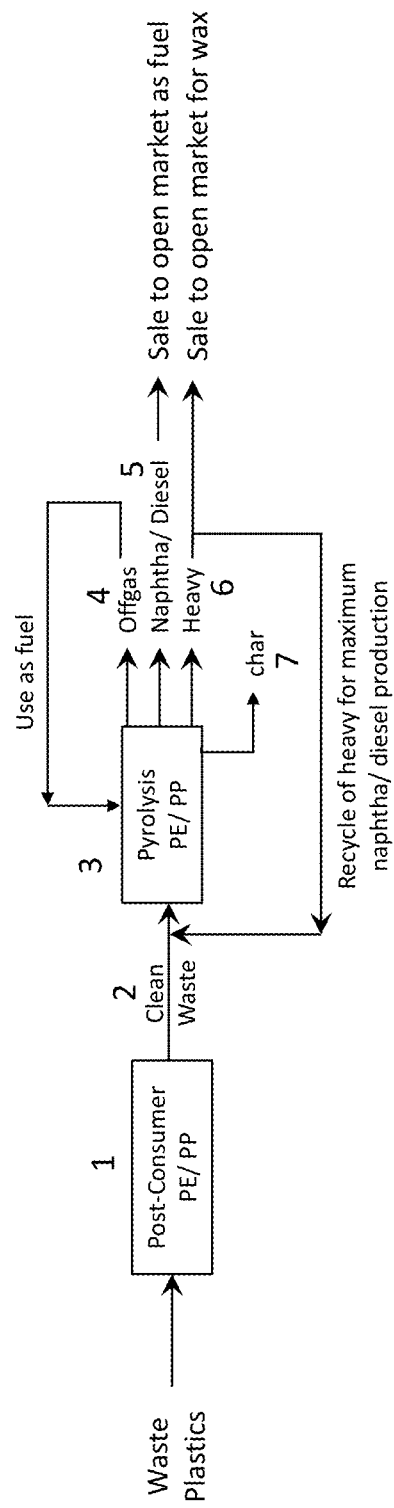
FIG. 1 depicts the current practice of pyrolyzing waste plastics to produce fuel or wax (base case).

Disclosed are a novel plastic and bio feedstock blend, and a process of preparing the blend. The blend can be used in the direct conversion of plastic in a conversion unit, such as a refinery process unit.

In one embodiment, provided is a process for preparing a hot homogeneous liquid blend of plastic, preferably waste plastic, and bio feedstock for feeding to a refinery unit. The process comprises first selecting plastics, preferably waste plastics, containing polyethylene, polypropylene, and/or polystyrene. These waste plastics are then passed through a hot blend preparation unit to make a homogeneous liquid blend of waste plastic and petroleum. The hot homogenous liquid blend is fed to a refinery conversion unit for direct conversion of waste plastic to value-added chemicals and fuels.

The hot homogeneous blend is made by melting plastic with hot bio feedstock to produce a hot, homogeneous liquid blend of plastic melt and bio feedstock. The preferred range of the plastic in the blend is about 1-20 wt %. In one embodiment, the conditions for preparing the hot liquid blend include heating the blend above the melting point of the plastic while vigorously mixing with a bio feedstock. The preferred process conditions include heating to 250-550° F., a residence time of 5-240 minutes at the final heating temperature, and 0-10 psig atmospheric pressure. This can be done in the open atmosphere as well as preferably under an oxygen-free inert atmosphere.

In one embodiment, provided is a process for preparing a stable blend of plastic, preferably waste plastic, and bio feedstock for storage, transportation or feeding to a refinery unit. The process comprises first selecting plastics, preferably waste plastics, containing polyethylene, polypropylene and/or polystyrene. These waste plastics are then passed through a stable blend preparation unit to make a stable blend of waste plastic and bio feedstock. The stable blend can be fed to a refinery conversion unit for direct conversion of waste plastic to value-added chemicals and fuels.

The present stable blend is made by a two-step process. The first step produces a hot, homogeneous liquid blend of plastic melt and bio feedstock. The preferred range of the plastic composition in the blend is about 1-20 wt %. In one embodiment, the conditions for preparing the hot liquid blend include heating the plastic above the melting point of the plastic while vigorously mixing with a bio feedstock. The preferred process conditions include heating to 250-550° F., a residence time of 5-240 minutes at the final heating temperature, and 0-10 psig atmospheric pressure. This can be done in the open atmosphere as well as preferably under an oxygen-free inert atmosphere.

In the second step, the hot blend is cooled down below the melting point of the plastic while continuously, vigorously mixing with the bio feedstock, and then further cooling to a lower temperature, preferably an ambient temperature, to produce a stable blend.

The resulting composition comprises a stable blend of a waste plastic and a bio feedstock for direct conversion of waste plastic in a conversion unit, such as a refinery process unit. The resulting composition is novel and offers many benefits.

The stable blend is made of bio feedstock and 1-20 wt % of plastic waste, wherein the plastic is mostly polyethylene, polypropylene and/or polystyrene, and the plastic is in the form of finely dispersed micron size particles.

The stable blend can be fed to a catalytic conversion process for simultaneous conversion of the bio feedstock and waste plastics to chemical feedstocks.

There are several advantages realized in implementing these concepts.

For example, FIG. 1 is a simplified process diagram for the base case of a waste plastics pyrolysis process generally operated in the industry today. Generally, the waste plastics are sorted together 1. The cleaned plastic waste 2 is converted in a pyrolysis unit 3 to offgas 4 and pyrolysis oil (liquid product). The offgas 4 from the pyrolysis unit 3 is used as fuel to operate the pyrolysis unit. An on-site distillation unit separates the pyrolysis oil to produce naphtha and diesel 5 products which are sold to fuel markets. The heavy pyrolysis oil fraction 6 is recycled back to the pyrolysis unit

3 to maximize the fuel yield. Char 7 is removed from the pyrolysis unit 3. The heavy fraction 6 is rich in long chain, linear hydrocarbons, and is very waxy (i.e., forms paraffinic wax upon cooling to ambient temperature). Wax can be separated from the heavy fraction 6 and sold to the wax markets.

The present process does not pyrolyze the waste plastic. Rather, a blend of a bio feedstock and waste plastic is prepared. Thus, the pyrolysis step can be avoided, which is a significant energy savings.

The blend can be prepared in a hot blend preparation unit where the operating temperature is above the melting point of the plastic (about 150-300° C.), to make a hot, homogeneous liquid blend of plastic and bio feedstock. The hot homogeneous liquid blend of plastic and bio feedstock can then be fed directly to conversion units such as refinery units.

Alternatively, a blend is prepared in a stable blend preparation unit where the hot homogeneous liquid blend is cooled to ambient temperature in a controlled manner to allow for easy storage and transportation. By using this method, a stable blend can be prepared at a facility away from a refinery and can be transported to a refinery unit. Then the stable blend is heated above the melting point of the plastic to feed to the refinery conversion unit. The stable blend is a physical mixture of micron size plastic particles finely suspended in the bio feedstock. The mixture is stable, and the plastic particles do not settle or agglomerate upon storage for extended period.

What is meant by heating the blend to a temperature above the melting point of the plastic is clear when a single plastic is used. However, if the waste plastic comprises more than one waste plastic, then the melting point of the plastic with the highest melting point is exceeded. Thus, the melting points of all plastics must be exceeded. Similarly, if the blend is cooled below the melting point of the plastic, the temperature must be cooled below the melting points of all plastics comprising the blend.

The stable blend of plastic and bio feedstock can be stored at ambient temperature and pressure for extended time periods. During the storage, no agglomeration of polymer and no chemical/physical degradation of the blend is observed. This allows easier handling of the waste plastic material for storage or transportation.

The stable blend can be handled easily by using standard pumps typically used in refineries or warehouses, or by using pumps equipped with transportation tanks. Depending on the blend, some heating of the blend above its pour point is required to pump the blend for transfer or for feeding to a conversion unit, e.g., in a refinery. During the heating, no agglomeration of polymer is observed.

For feeding to a conversion unit, the stable blend is further heated above the melting point of the plastic to produce a homogeneous liquid blend of bio feedstock and plastic. The hot homogeneous liquid blend is fed directly to the oil refinery process units for conversion of waste plastics and bio feedstock to high-value, sustainable products with good yields.

Also compared with the pyrolysis unit, these blend preparation units operate at a much lower temperature (~500-600° C. vs. 120-300° C.). Thus, the present process is a far more energy efficient process in preparing a refinery feedstock derived from waste plastic than a thermal cracking process such as pyrolysis.

The use of the present waste plastic/bio feedstock blend further increases the overall hydrocarbon yield obtained from the waste plastic. This increase in yield is significant. The hydrocarbon yield using the present blend offers a hydrocarbon yield that can be as much as 98%. To the contrary, pyrolysis produces a significant amount of light product from plastic waste, about 10-30 wt. %, and about 5-10 wt. % of char. These light hydrocarbons are used as fuel to operate the pyrolysis plant, as mentioned above. Thus, the liquid hydrocarbon yield from the pyrolysis plant is at most 70-80%.

When the present blend is passed into the refinery units, such as a FCC unit, only a minor amount of offgas is produced. Refinery units use catalytic cracking processes that are different from the thermal cracking process used in pyrolysis. With catalytic processes, the production of undesirable light-end byproducts such as methane and ethane are minimized. Refinery units have efficient product fractionation and are able to utilize all hydrocarbon products streams efficiently to produce high value materials. Refinery co-feeding will produce only about 2% of offgas ($H_2$, methane, ethane, ethylene). The $C_3$ and $C_4$ streams are captured to produce useful products such as circular polymer and/or quality fuel products. Thus, the use of the present bio feedstock/plastic blend offers increased hydrocarbons from the plastic waste, as well as a more energy efficient recycling process compared to a thermal process such as pyrolysis.

Figure 2:
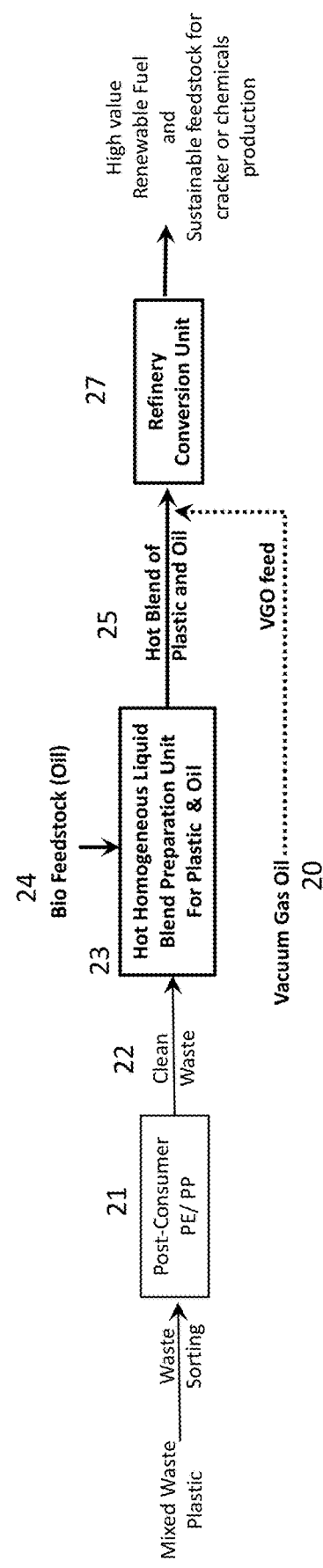
FIG. 2 depicts a present process of preparing a hot homogeneous liquid blend of plastic and bio feedstock, and the feeding of the blend to a refinery conversion unit.

FIG. 2 illustrates a method for preparing a hot homogeneous blend of plastic and bio feedstock in accordance with the present process. The blend can be used for direct injection to a conversion unit. The preferred range of the plastic composition in the blend is about 1-20 wt. %. If high molecular weight polypropylene (average molecular weight of 250,000 or greater) waste plastic or high-density polyethylene (density above 0.93 g/cc) is used as the predominant waste plastic, e.g., at least 50 wt. %, then the amount of waste plastic used in the blend is more preferably about 10 wt. %. The reason being that the pour point and viscosity of the blend would be high.

The preferred conditions for the blend preparation include heating the plastic above the melting point of the plastic while vigorously mixing with a bio feedstock. The preferred process conditions include heating to a 250-550° F. temperature, with a residence time of 5-240 minutes at the final heating temperature, and 0-10 psig atmospheric pressure. This can be done in the open atmosphere as well as preferably under an oxygen-free inert atmosphere.

Referring to FIG. 2 of the Drawing, a stepwise preparation process of preparing the hot homogeneous blend of plastic and bio feedstock is shown. Mixed waste plastic is sorted to create post-consumer waste plastic 21 comprising polyethylene and/or polypropylene. The waste plastic is cleaned 22 and then mixed with a bio feedstock oil 24 in a hot blend preparation unit 23. After the mixing in 23, the homogeneous blend of the plastic and bio oil is recovered 25. Optionally a filtration device may be added (not shown) to remove any undissolved plastic particles or any solid impurities present in the liquid blend. The blend of the plastic and bio oil can then be passed to a catalytic conversion unit 27. Optionally, the conversion unit may co-process vacuum gas oil 20 or another refinery conventional feedstock.

In one embodiment, the conversion unit can be a catalytic refinery unit such as a FCC unit.

Figure 3:
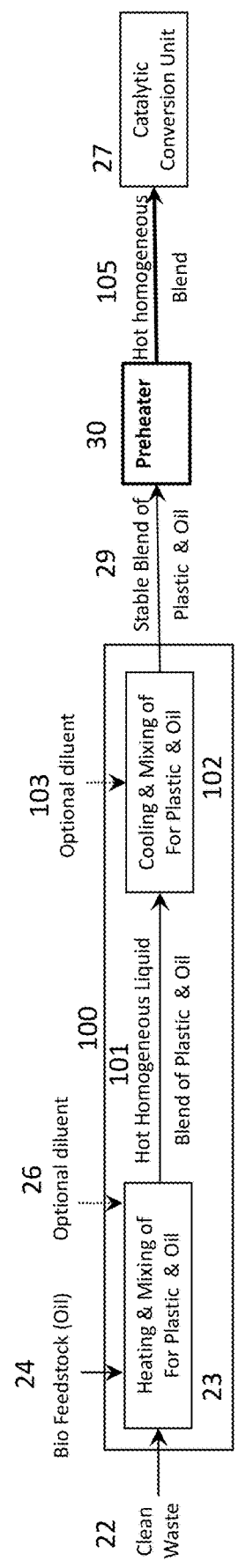
FIG. 3 depicts in detail a stable blend preparation unit process, and how the stable blend can be fed to a refinery conversion unit.

FIG. 3 illustrates a method for preparing a stable blend of plastic and oil. The stable blend is made in a stable blend preparation unit by a two-step process. The first step produces a hot, homogeneous liquid blend of plastic melt and bio feedstock, the step identical to the hot blend preparation process described in FIG. 2. The preferred range of the plastic composition in the blend is about 1-20 wt. %. If high molecular weight polypropylene (average molecular weight of 250,000 or greater) waste plastic or high-density polyethylene (density above 0.93 g/cc) is used as the predominant waste plastic, e.g., at least 50 wt. %, then the amount of waste plastic used in the blend is more preferably about 10 wt. %. The reason being that the pour point and viscosity of the blend would be high.

The preferred conditions for the hot homogeneous liquid blend preparation in the first step include heating the plastic above the melting point of the plastic while vigorously mixing with a bio feedstock. The preferred process conditions include heating to a 250-550° F. temperature, with a residence time of 5-240 minutes at the final heating temperature, and 0-10 psig atmospheric pressure. This can be done in the open atmosphere as well as preferably under an oxygen-free inert atmosphere. An optional diluent 26 can be added during the mixing.

In the second step, the hot blend is cooled down below the melting point of the plastic while continuously vigorously mixing. The further cooling is to a lower temperature, preferably ambient temperature, to produce a stable blend of plastic and oil.

It has been found that the stable blend is an intimate physical mixture of plastic and bio feedstock. The plastic is in a "de-agglomerated" state in the bio feedstock. The plastic maintains a finely dispersed state of micron size solid particles in the bio feedstock at temperatures below the melting point of the plastic, and particularly at ambient temperatures. The blend is stable and allows easy storage and transportation. At a refinery, the stable blend can be heated in a preheater above the melting point of the plastic to produce a hot, homogenous liquid blend of the plastic and bio feedstock. The hot liquid blend can then be fed to a conversion unit.

In FIG. 3, further details of the stable blend preparation are shown. The stable blend is made in a stable blend preparation unit 100 by a two-step process. As shown, clean waste 22 is passed to the hot blend preparation unit 23. The selected plastic waste 22 is mixed with a bio feedstock oil 24 and heated above the melting point of the plastic in unit 23. The mixing is often quite vigorous. An optional diluent 26 can be added during the mixing. The mixing and heating conditions can generally comprise heating at a temperature in the range of about 250-550° F., with a residence time of 5-240 minutes at the final heating temperature. The heating and mixing can be done in the open atmosphere or under an oxygen-free inert atmosphere. The result is a hot, homogenous liquid blend of plastic and oil 101. Optionally a filtration device may be added (not shown) to remove any undissolved plastic particles or any solid impurities present in the hot homogeneous liquid blend.

The hot blend 101 is then cooled below the melting point of the plastic while continuing the mixing of the plastic and bio oil blend at unit 102. An optional diluent 103 can be added during the mixing and cooling. Cooling generally continues, usually to an ambient temperature, to produce a stable blend of the plastic and oil 29. At a refinery, the stable blend can be fed to a preheater 30, which heats the blend above the melting point of the plastic to produce a hot homogeneous mixture of plastic/bio oil blend 105, which is then fed to a refinery conversion unit 27. Optionally, the conversion unit may co-process vacuum gas oil or another refinery conventional feedstock.

Figure 4:
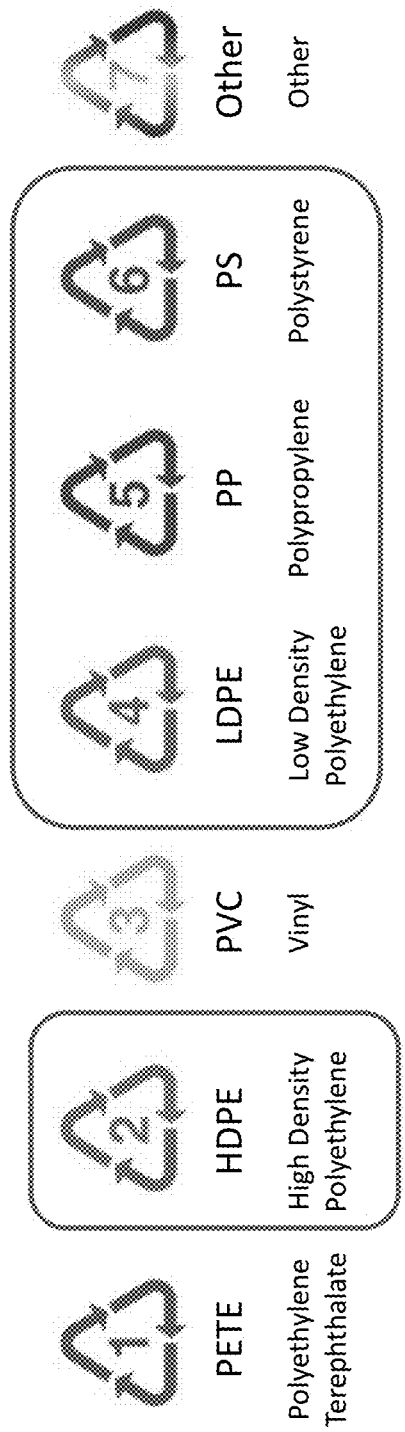
FIG. 4 depicts the plastic type classification for waste plastics recycling.

The preferred plastic starting material for the present process is sorted waste plastics containing predominantly polyethylene and polypropylene (plastics recycle classification types 2, 4, and 5). The pre-sorted waste plastics are washed and shredded or pelleted to feed to a blend preparation unit. FIG. 4 depicts the plastic type classification for waste plastics recycling. Classification types 2, 4, and 5 are high density polyethylene, low density polyethylene and polypropylene, respectively. Any combination of the polyethylene and polypropylene waste plastics can be used. For the present process, at least some polyethylene waste plastic is preferred. Polystyrene, classification 6, can also be present.

Proper sorting of waste plastics is very important in order to minimize contaminants such as N, Cl, and S. Plastics waste containing polyethylene terephthalate (plastics recycle classification type 1), polyvinyl chloride (plastics recycle classification type 3) and other polymers (plastics recycle classification type 7) need to be sorted out to less than 5%, preferably less than 1% and most preferably less than 0.1%. The present process can tolerate a moderate amount of polystyrene (plastics recycle classification type 6). Waste polystyrene needs to be sorted out to less than 20%, preferably less than 10% and most preferably less than 5%.

Washing of waste plastics can remove metal contaminants such as sodium, calcium, magnesium, aluminum, and non-metal contaminants coming from other waste sources. Non-metal contaminants include contaminants coming from the Periodic Table Group IV, such as silica, contaminants from Group V, such as phosphorus and nitrogen compounds, contaminants from Group VI, such as sulfur and oxygen compounds, and halide contaminants from Group VII, such as fluoride, chloride, and iodide. The residual metals, non-metal contaminants, and halides need to be removed to less than 50 ppm, preferentially less than 30 ppm and most preferentially to less than 5 ppm.

The term "bio" refers to biochemical and/or natural chemicals found in nature. Thus, a bio feedstock or bio oil would comprise such natural chemicals. The preferred starting bio feedstocks for the blend preparation include triglycerides and fatty acids, plant-derived oils such as palm oil, canola oil, corn oil, and soybean oil, as well as animal-derived fats and oils such as tallow, lard, schmaltz (e.g., chicken fat), and fish oil, and mixtures of these. In one embodiment, the bio feedstock can comprise biomass pyrolysis oil prepared by pyrolyzing a bio feedstock material.

The most preferred bio feedstocks are palm oil and tallow, with a high degree of saturation exhibiting an iodine number of 70 or below (i.e., low degree of unsaturation). The iodine number (or iodine value) is a measure of the amount of unsaturation in fats, oils and waxes. It is determined by measuring the mass of iodine in grams consumed by 100 g of substance. A higher value means a substance is more unsaturated. It is similar to the use of the bromine number to measure unsaturation in petroleum samples.

It has been discovered that bio feedstocks with polyunsaturated fatty acids with a high iodine number, such as soybean oil (with 130 iodine number), do not make stable blends with plastic. However, a bio feedstock mixture consisting of low (≤70) and high (>70) iodine number bio feedstocks can make a stable blend with plastic. It has been discovered bio feedstock mixtures with about a 95 iodine number or less make a stable blend with plastic. In one embodiment, the mixture of bio feedstocks exhibits an iodine number of 91 or less.

Further the plastic and bio feedstock blend can be blended with other diluent hydrocarbons, such as heptane, as needed to alter the properties of the blend, e.g., the viscosity or pour point, for easier handling or for processing. Preferred blending hydrocarbon feedstocks include standard petroleum-based feedstocks such as vacuum gas oil (VGO), an aromatic solvent or light cycle oil (LCO). In one embodiment, the blending hydrocarbon feedstock comprises atmospheric gas oil, VGO, or heavy stocks recovered from other refinery operations. In another embodiment, the blending hydrocarbon feedstock comprises LCO, heavy cycle oil (HCO), FCC naphtha, gasoline, diesel, toluene, or aromatic solvent derived from petroleum. A portion of the liquid FCC product (naphtha and LCO for example) could also be recycled to the blend in order to lower the viscosity. In one embodiment, no petroleum feedstocks are used, and only bio feedstocks are used in creating the blend and mixing with the blend.

While not wishing to be bound by a theory, the prepared stable blend is an intimate physical mixture of plastic and bio feedstock for catalytic conversion units. The present process produces a stable blend of bio feedstock and plastic wherein plastic is in a "de-agglomerated" state. This blend is stable and allows easy storage and transportation. At a refinery, the stable blend is preheated above the melting point of the plastic to produce a hot homogeneous liquid blend of plastic and bio feedstock, and then the hot liquid blend is fed to a conversion unit. Then both the bio feed and plastic are simultaneously converted in the conversion unit with typical refinery catalysts containing zeolite(s) and other active components such as silica-alumina, alumina and clay.

Catalytic conversion units such as a fluid catalytic cracking (FCC) unit, hydrocracking unit, and hydrotreating unit, can convert the hot homogeneous liquid blend of plastic and bio feedstock in the presence of catalysts for simultaneous conversion of the plastic and bio feedstock. The presence of catalysts in the conversion unit allows conversion of the waste plastics to higher value products at a lower operating temperature than the typical pyrolysis temperature. For the hydroprocessing units (hydrocracking and hydrotreating units), hydrogen is added to units to improve the conversion of the plastics.

Fluid catalytic cracking process is the preferred mode of catalytic conversion of the stable blend. The catalyst selection can be optimized to maximize monomer production for the manufacture of virgin plastics.

The yields of undesirable byproducts (offgas, tars, coke) are lower than the typical pyrolysis process. The blend can also generate additional synergistic benefits coming from the interaction of plastic and bio feedstock during the conversion process.

The stable blend of plastic and bio feedstock would allow more efficient recycling of waste plastics and enable truly circular and sustainable plastics and chemicals production. It is far more energy efficient than the current pyrolysis process and allows recycling with a lower carbon footprint. The improved processes would allow the establishment of circular economy at a much larger scale by efficiently converting waste plastics back to the virgin quality polymers or value-added chemicals and fuels.

A dedicated conversion unit for conversion of plastic and bio feedstock blend will generate sustainable, low-carbon chemical intermediates and fuel without any petroleum feed stock usage. Alternatively, the plastic and bio feedstock blend can be fed to oil refinery conversion units for co-processing with petroleum-based oil.

Figure 5:
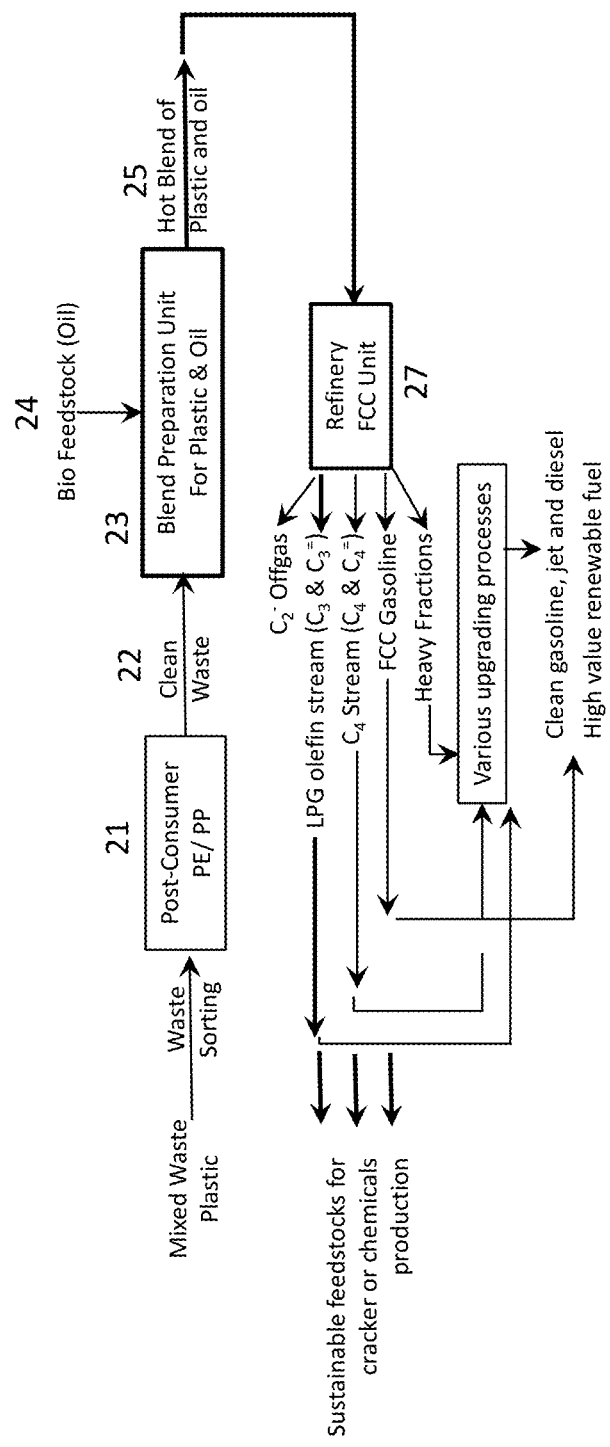
FIG. 5 depicts an embodiment where the present blend is passed to a refinery FCC unit.

FIG. 5 shows one embodiment of a present integrated process, where the blend is sent to a fluid catalytic cracking (FCC) unit. The same numbers in FIG. 5 that correspond to FIGS. 2 and 3 refer to the same items/units. As shown, the blend of plastic and oil is prepared 25. The blend is generally heated, if needed, to a temperature above the melting point of the plastic before passing to a FCC unit 27 in a refinery. In another embodiment, the heated blend and optionally a co-blend VGO co-feed are passed to the FCC unit, or each are passed directly, but separately, to the FCC unit. Various hydrocarbon streams can be recovered from the FCC unit. The streams can be used as feedstocks for cracker or chemicals production, or in the preparation of clean gasoline, jet fuel or diesel fuel.

The following examples are provided as an illustration of the present blend and process and are not meant to be limiting.

Example 1: Properties of Plastic Samples, and Bio Feedstocks Used for Blend Preparations Five plastic samples, low density polyethylene (LDPE, Plastic A), high density polyethylene (HDPE, Plastic B), two polypropylene samples with average molecular weight of ~12,000 (PP, Plastic C) and ~250,000 (PP, Plastic D), and polystyrene (PS, plastic E) were purchased, and their properties are summarized in Table 1.

TABLE 1

Properties of Plastics Used

|  | LDPE (Plastic A) | HDPE (Plastic B) | PP (Plastic C) | PP (Plastic D) | PS (Plastic E) |
|---|---|---|---|---|---|
| Form | Pellets | Pellets | Pellets | Pellets | Pellets |
| Melt Index | 25 g/10 min (190° C./2.16 kg) | 12 g/10 min (190° C./2.16 kg) | — | 12 g/10 min (230° C./2.16 kg) | 2.0-4.0 g/10 min (200° C./5kg) |
| Melting Point, ° C. | 116 | 125-140 | 157 | 160-165 | 270 |
| Transition Temp, ° C. | 93, softening | 125, softening | 163, softening | — | 95 |
| Density, g/mL at 25° C. | 0.925 | 0.952 | 0.9 | 0.9 | 1.04 |
| Hardness | — | 66 | — | 100 | — |
| Average molecular weight, $M_w$ | — | — | ~12,000 | ~250,000 | ~350,000 |
| Average molecular weight, $M_n$ | — | — | ~5,000 | ~67,000 | ~170,000 |

Bio feedstocks used to prepare blends with plastic melts include palm oil, tallow and soybean oil, and their properties are shown in Table 2.

TABLE 2

Properties of Bio Feedstocks for Blend Preparation

|  | Palm Oil, Bio Feed #1 | Tallow, Bio Feed #2 | Soybean Oil, Bio Feed #3 |
|---|---|---|---|
| Specific Gravity | 22.9 | 23.2 | 21.4 |
| Carbon, wt % | 76.8 | 76.65 | 78 |
| Hydrogen, wt % | 12.1 | 12 | 11.6 |
| Oxygen, wt % | 11.1 | 11.4 | 10.4 |
| H/C Molar Ratio | 1.87 | 1.86 | 1.77 |
| Iodine Number | 52 (measured) 49-55 (ref a) | 45 (measured) 42-48 (ref b) | 130 (measured) 120-139 (ref c) |
| Total S, ppm | <6 | 11 | <6 |
| Total N, ppm | 2.2 | 140 | 20.3 |
| Ni, ppm | <0.9 | <0.9 | <0.7 |
| V, ppm | <1.5 | <1 | <0.7 |
| Simdist, ° F. |  |  |  |
| IBP (0.5%) | 959 | 679 | 996 |
| 5 wt % | 997 | 1062 | 1100 |
| 10 wt % | 1083 | 1083 | 1109 |
| 30 wt % | 1097 | 1099 | 1112 |
| 50 wt % | 1099 | 1111 | 1124 |
| 70 wt % | 1110 | 1113 | 1125 |
| 90 wt % | 1120 | 1125 | 1127 |
| 95 wt % | 1122 | 1134 | 1127 |
| FBP (99.5%) | 1137 | 1136 | 1149 | a) Sanders T H (2003). "Ground Nut oil". Encyclopedia of Food Sciences and Nutrition. Elsevier. pp. 2967-2974. doi: 10.1016/b0-12-227055-x/01353-5. ISBN 978-0-12-227055-0.
b) Andersen A J, Williams P N (4 Jul. 2016). Margarine. Elsevier. pp. 30-. ISBN 978-1-4831-6466-3.
c) O'Brien R D (5 Dec. 2008). Fats and Oils: Formulating and Processing for Applications (3 ed.). CRC Press. ISBN 978-1-4200-6167-3.

Figure 6:
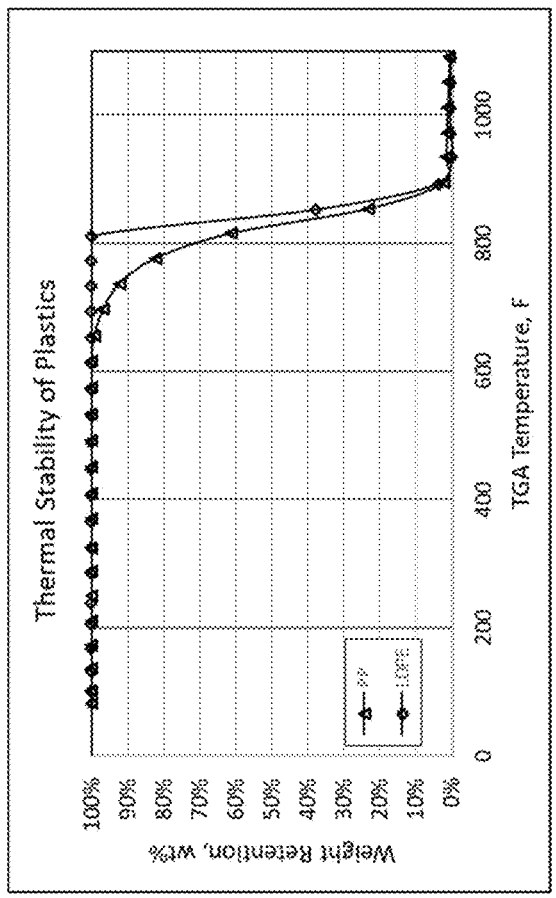
FIG. 6 graphically depicts a thermal gravimetric analysis (TGA) of the thermal stability of polyethylene (LDPE) and polypropylene (PP).

Thermal Gravimetric Analysis (TGA) was conducted with Plastic A (LDPE) and Plastic C (Polypropylene) to verify the plastic materials are thermally stable well above the melt preparation temperature. TGA results shown in FIG. 6 indicate the LPDE sample is stable up to 800° F. and the polypropylene sample up to 700° F.

Example 2—Preparation of Stable Blends of Palm Oil and Plastic

Several blends of palm oil and the plastic were prepared by adding the plastic pellets (Plastic A through D) to a palm oil (Bio Feed #1).

The following procedure is used. At ambient temperature, the palm oil (waxy solids) was added to a beaker. The palm oil was heated with a heating mantle while stirring with a magnetic stirrer. The palm oil temperature was raised gradually to 270-400° F., and then pre-weighed plastic pellets (solids) were slowly added to the hot palm oil while stirring and heating. After the plastic pellets had dissolved, the stirred solution was then held at the final temperature for 30 additional minutes for blends with LDPE and Plastic C polypropylene, or for 60 minutes for blends with HDPE and Plastic D polypropylene. Then the blend was cooled down to ambient temperature while stirring. Visual observation indicated the blend is completely homogeneous. Upon cooling to ambient temperature, the blend of the plastic and palm oil showed the visual appearance of the waxy solid of the palm oil, but the hardening temperature (or solidification temperature) were different from the starting palm oil.

To assess material handling needs, a pour point (per ASTM D5950-14) and viscosity (per ASTM D445) of the blend were measured. In addition, the content of hot heptane insoluble material was measured per ASTM D3279 procedure. The hot heptane insoluble method determines the weight percent of material in oils that is insoluble in hot heptane at 80° C. The method isolates the insoluble material using 0.8-micron membrane filter. The heptane insoluble content provides information on non-dissolved plastic in the blend.

Material stability was observed by visual observation. The blend of plastic and palm oil was stable, and no change was observed for a 3-month period of observation.

Table 3 below summarizes the list of samples prepared and their properties.

TABLE 3

Preparation for Stable Blends of Plastic and Palm Oil

| Example | Wt % Plastic in the Blend | Pour Point ° C. | Viscosity at 180° C. | Heptane Insoluble, wt % | Storage Stability |
|---|---|---|---|---|---|
| Example 2-1 | None (base case) | 10 | 2.82 | 0.02 | Stable |
| Example 2-2 | 10 wt % LDPE (Plastic A) | 93 | 31.87 | 7.59 | Stable |
| Example 2-3 | 10 wt % HDPE (Plastic B) | — | — | — | Stable |
| Example 2-4 | 10 wt % PP (Plastic C) | 13 | 6.60 | 7.78 | Stable |
| Example 2-5 | 20 wt % PP (Plastic C) | — | — | — | Stable |
| Example 2-6 | 10 wt % PP (Plastic D) | — | — | — | Stable |

The pour point and viscosity values are used to guide equipment selection and operating procedure. The blends made with addition of plastic show moderate increases of pour point and viscosity compared with the pure bio base case. These changes can be handled with typical refinery operating equipment with minor or no modifications. The blend tank will be heated above the pour point to change the physical state of the blend into an easily transferable liquid. Then, the liquid blend can be transferred to a transportation vessel or to a refinery unit via pumping with a pump or via draining using gravity force or via transferring using a pressure differential.

The stable blends stay as physical mixtures at temperatures up to 80° C. The plastic was separated from the blend using the hot heptane insoluble test. At 80° C., all the wax in palm oil was dissolved in the heptane solvent (Examples 2-1) and the heptane insoluble solids was only wt %. The weight percent of heptane insoluble material is coming from undissolved plastic that was filtered out with the 0.8-micron membrane filter. The amounts of recovered as solid material in Examples 2-2 and 2-4. showed 7.6 and 7.8 wt % heptane insoluble solids, similar to the amount of plastic added for the blend prep. The recovered amounts are less by 2.2-2.4 wt % suggesting there may be very fine particles in the blend that are sub-micron in size. The heptane insoluble results in Table 3 clearly indicated that the plastic is a physical mixture of solid particles dispersed in palm oil in the blend at 80° C. and that the bulk of plastic particles can be separated with the 0.8-micron filter.

Example 3—Preparation of Stable Blends of Tallow and Plastic

Several blends of tallow and plastic samples were prepared by adding the plastic pellets to a tallow feed (Bio Feed #2).

The procedure described in Example 2 was used for these blend preparations.

TABLE 4

Preparation for Stable Blends of Plastic and Tallow

| Example | Wt % Plastic in the Blend | Pour Point ° C. | Viscosity at 180° C. | Heptane Insoluble, wt % | Storage Stability |
|---|---|---|---|---|---|
| Example 3-1 | None (base case) | 30 | 2.96 | 0.04 | Stable |
| Example 3-2 | 10 wt % LDPE (Plastic A) | 93 | 33.01 | 7.67 | Stable |
| Example 3-3 | 10 wt % HDPE (Plastic B) | — | — | — | Stable |
| Example 3-4 | 10 wt % PP (Plastic C) | 29 | 7.65 | 8.64 | Stable |
| Example 3-5 | 20 wt % PP (Plastic C) | — | — | — | Stable |
| Example 3-6 | 10 wt % PP (Plastic D) | — | — | — | Stable |

The blends made with addition of plastic to tallow show moderate increases of pour point and viscosity compared with the pure bio base case, similar to the palm oil results shown in Example 2.

The weight percent of heptane insoluble material recovered as solid material matches well with the amounts of plastic added to the blend preparations. The base tallow (Example 3-1) has only 0.04 wt % the heptane insoluble while the stable blends (Example 3-2 and 3-4) showed 7.7 and 8.6 wt % heptane insoluble solid contents, similar to the amount of plastic added for the blend prep. The recovered amounts are 1.4-2.3 wt % less than the amount of plastic charged suggesting there may be very fine particles in the blend that are sub-micron in size. The heptane insoluble results in Table 4 clearly indicate that the plastic is a physical mixture of solid particles dispersed in palm oil in the blend at 80° C., and that the bulk of plastic particles can be separated with the 0.8-micron filter.

Example 4—Preparation of Soybean Oil and Plastic Blends (Comparative Example)

An attempt was made to prepare blends of soybean oil (Bio Feed #3) and the plastic by using the procedures described in Example 2 with the plastic pellets (Plastic A through D). Surprisingly, soybean oil and plastic did not make hot homogeneous liquid melt upon heating together in the same manner as with palm oil or tallow. As the mixtures were heated above the melting point of the plastics the pellets did soften and lose their shape. But instead of forming an homogeneous liquid as in the other cases, the plastic melt formed a separate liquid phase from the soybean oil (SBO). Upon cooling, a plastic phase was agglomerated and formed a large plastic solid piece. The likely explanation for this is that the SBO has a much higher degree of unsaturation, as is evident by its H/C ratio being lower than that of tallow or palm oil, and also from the measured iodine number. This also explains the reason most petroleum feeds, as well as highly saturated oils and fats as determined by the iodine number, readily dissolve plastics.

TABLE 5

Preparation for Stable Blends of Plastic and Soybean Oil

| Example | Wt % Plastic in the Blend | Product description. |
|---|---|---|
| Example 4-1 | 10 wt % LDPE (Plastic A) | Stable blend cannot be made |
| Example 4-2 | 10 wt % HDPE (Plastic B) | Stable blend cannot be made |

TABLE 5-continued

Preparation for Stable Blends of Plastic and Soybean Oil

| Example | Wt % Plastic in the Blend | Product description. |
|---|---|---|
| Example 4-3 | 10 wt % PP (Plastic C) | Stable blend cannot be made |
| Example 4-4 | 10 wt % PP (Plastic D) | Stable blend cannot be made |

Example 5—Preparation of Soybean Oil, Palm Oil and Plastic Blends

A 1:1 weight mix of soybean oil and palm oil was prepared (mixed bio feedstock). With the mixed bio feedstock, successful blends of palm oil, soybean oil and the plastic were prepared by adding the plastic pellets (Plastic A and C) to the 1:1 mix of palm oil and soybean oil (Bio Feed #1 and Bio Feed #3). Therefore, soybean oil can be used as a component in the mixed bio feedstock. The stable blends showed good shelf life and did not show any changes for several months. These results show that soybean oil can also be used as a bio feedstock to prepare a stable blend with plastic, by lowering its unsaturation with another bio feedstock.

This test also demonstrates an acceptable iodine number to make a successful stable blend of plastic and bio feedstock. The iodine number of 1:1 mixture of soybean oil and palm oil is estimated as 91. These results show that soybean oil or other highly unsaturated oils can also be used as a bio feedstock to prepare a stable blend with plastic, to the extent the overall unsaturation of mixed bio feedstock has an iodine number of 95 or less, and preferably 91 or less.

TABLE 6

Preparation for Stable Blends of Plastic, Soybean Oil and Palm Oil

| Example | Wt % Plastic in the Blend | Pour Point °C. | Viscosity at 180° C. | Heptane Insoluble, wt % | Storage Stability |
|---|---|---|---|---|---|
| Example 5-1 | 10 wt % LDPE (Plastic A) | 17 | 31.98 | 6.78 | Stable |
| Example 5-2 | 10 wt % PP (Plastic C) | 125 | — | — | Stable |

Example 6—Preparation of Soybean Oil, Tallow and Plastic Blends

A 1:1 mix of soybean oil and tallow was prepared (mixed bio feedstock). With the mixed bio feedstock, blends of tallow, soybean oil and the plastic were successfully prepared by adding the plastic pellets (Plastic A and C) to the 1:1 mix of tallow and soybean oil (Bio Feed #1 and Bio Feed #3). The stable blends showed good shelf life and no change was seen for several months. These results again show that soybean oil can also be used as a bio feedstock to prepare a stable blend with plastic, by lowering its unsaturation with another bio feedstock.

This test also shows an acceptable iodine number to make a successful stable blend of plastic and bio feedstock. The iodine number of 1:1 mixture of soybean oil and tallow is estimated as 88.

TABLE 7

Preparation for Stable Blends of Plastic, Soybean and Tallow

| Example | Wt % Plastic in the Blend | Stable Blend Preparation | Storage Stability |
|---|---|---|---|
| Example 6-1 | 10 wt % LDPE (Plastic A) | Successful | Stable |
| Example 6-2 | 10 wt % PP (Plastic C) | Successful | Stable |

To study the impact of processing waste plastics and bio feedstocks in a FCC unit, laboratory tests of fluidized catalytic cracking (FCC) process were carried out with stable blends of plastic and bio feedstocks. Two FCC catalysts were used for the study: a ZSM-5 FCC catalyst made of ZSM-5 zeolite (10-membered ring medium pore zeolite) and a USY FCC catalyst made of USY (12-membered ring medium pore zeolite). Three bio feedstocks, palm oil, soybean oil and tallow were used.

The catalytic cracking experiments were carried out in an ACE (advanced cracking evaluation) Model C unit fabricated by Kayser Technology Inc. (Texas, USA). The reactor employed in the ACE unit was a fixed fluidized reactor with 1.6 cm ID. Nitrogen was used as fluidization gas and introduced from both bottom and top. The top fluidization gas was used to carry the feed injected from a calibrated syringe feed pump via a three-way valve. The experiments were carried out at atmospheric pressure and temperature of 975° F. For each experiment a constant amount of 1.5-gram of feed was injected at the rate of 1.2 gram/min for seconds. The cat/oil ratio was kept at 6. After 75 seconds of feed injection, the catalyst was stripped off by nitrogen for a period of 525 seconds. During the catalytic cracking and stripping process the liquid product was collected in a sample vial attached to a glass receiver, which was located at the end of the reactor exit and was maintained at −15° C. The gaseous products were collected in a closed stainless-steel vessel (12.6 L) prefilled with N2 at 1 atm. Gaseous products were mixed by an electrical agitator rotating at 60 rpm as soon as feed injection was completed. After stripping, the gas products were further mixed for 10 mins to ensure homogeneity. The final gas products were analyzed using a refinery gas analyzer (RGA). After the completion of stripping process, the in-situ catalyst regeneration was carried out in the presence of air at 1300° F. The regeneration flue gas passed through a catalytic converter packed with CuO pellets (LECO Inc.) to oxidize CO to $CO_2$. The flue gas was then analyzed by an online IR analyzer located downstream the catalytic converter. Coke deposited during cracking process was calculated from the $CO_2$ concentrations measured by the IR analyzer.

Gaseous products, mainly $C_1$ through $C_7$ hydrocarbons, were resolved in an RGA. The RGA is a customized Agilent 7890B GC equipped with three detectors, a flame ionization detector (FID) for hydrocarbons and two thermal conductivity detectors for nitrogen and hydrogen. A methanizer was also installed on the RGA to quantify trace amount of CO and $CO_2$ in the gas products when bio feedstocks, such as soybean oil, palm oil or tallow are cracked. Gas products were grouped into dry gas ($C_2$-hydrocarbons and hydrogen), LPG ($C_3$ and $C_4$ hydrocarbons). CO and $CO_2$ were excluded from dry gas. Their yields were reported separately. Liquid products were weighed and analyzed in a simulated distillation GC (Agilent 6890) using ASTM D2887 method. The liquid products were cut into gasoline ($C_5$-430° F.), LCO (430-650° F., light cycle oil) and HCO (650° F.+, heavy cycle oil). Gasoline ($C_5$+ hydrocarbons) in the gaseous products were combined with gasoline in the liquid products as total gasoline. Light ends in the liquid products ($C_5$−) were also subtracted from liquid products and added back to $C_3$ and $C_4$ species using some empirical distributions. Material balances were between 98% and 101% for most experiments.

Detailed hydrocarbon analysis (DHA) using Agilent 6890A and Hydrocarbon Expert software from Separation Systems Inc., FL were also performed on the gasoline portion of liquid products for PONA and octanes (RON and MON). DHA analysis on the gasoline portion in gaseous products were not performed. The DHA results, however, still provided valuable information to evaluate catalytic cracking product properties.

Example 7—Direct Conversion of Plastic and Palm Oil Via FCC Using a ZSM-5 Catalyst Laboratory tests of fluidized catalytic cracking (FCC) process were carried out with stable blends of plastic and bio feedstock (Examples 2-2 and 5-1) using an FCC catalyst made of ZSM-5 zeolite and the results are summarized in Table 8.

TABLE 8

Evaluation of Plastic and Palm Oil Cofeeding to FCC with ZSM-5 Catalyst

| Example No. | Example 7-1 | Example 7-2 | Example 7-3 |
|---|---|---|---|
| Feed | 100% Palm Oil (Example 2-1 Bio Oil) | 10/90 wt % blend, LDPE/Palm Oil (Example 2-2 Blend) | 10/45/45 wt % blend, LDPE/Palm Oil/SBO (Example 5-1 Blend) |
| Cat/Oil, wt/wt | 6.0 | 6.0 | 6.0 |
| Conversion, wt %* | 97.79 | 98.00 | 95.53 |
| Yields | | | |
| Coke, wt % | 1.45 | 1.67 | 2.04 |
| Total Dry Gas, wt % | 5.69 | 6.45 | 6.12 |
| Hydrogen | 0.05 | 0.06 | 0.06 |
| Methane | 0.20 | 0.29 | 0.23 |
| Ethane | 0.22 | 0.28 | 0.28 |
| Ethylene | 5.22 | 5.82 | 5.55 |
| Total LPG, wt % | 34.97 | 37.21 | 33.08 |
| Propane | 2.72 | 3.65 | 3.16 |
| Propylene | 16.28 | 16.49 | 14.98 |
| n-Butane | 0.93 | 1.27 | 1.08 |
| Isobutane | 1.36 | 1.82 | 1.50 |
| C4 olefins | 13.68 | 13.97 | 12.37 |
| Gasoline, wt % | 42.03 | 40.38 | 42.66 |
| Composition of Gasoline Fraction | | | |
| n-Paraffins, wt % | 2.20 | 1.40 | 1.35 |
| Iso-paraffins, wt % | 6.59 | 5.51 | 4.06 |
| Aromatics, wt % | 76.26 | 80.62 | 85.02 |
| Naphthenes, wt % | 1.90 | 2.27 | 1.86 |
| Olefins, wt % | 12.30 | 10.06 | 7.34 |
| Benzene, wt % | 7.67 | 7.39 | 8.24 |
| Toluene, wt % | 25.89 | 27.01 | 29.11 |
| Ethylbenzene, wt % | 5.99 | 6.19 | 5.96 |
| m-xylene, wt % | 5.45 | 6.49 | 7.65 |
| p-xylene, wt % | 17.43 | 17.76 | 15.30 |
| o-xylene, wt % | 1.99 | 2.33 | 2.13 |
| p-xylene/total xylenes | 70% | 67% | 61% |
| LCO, wt % (430-650 F.) | 1.67 | 1.44 | 2.62 |
| HCO, wt % (650 F.+) | 0.54 | 0.71 | 1.84 |
| Gasoline Octane Number** | 104.42 | 104.53 | 103.37 |
| Aromatics, wt % of feed | 32.05 | 32.56 | 36.27 |
| C3=/C3 | 86% | 82% | 83% |
| C4=/C4 | 86% | 82% | 83% |
| C4=/C3= | 0.84 | 0.85 | 0.83 |

*Conversion - conversion of 430° F.+ fraction to 430° F.−
**Octane number, (R + M)/2, was estimated from detailed hydrocarbon GC of FCC gasoline.

The results in Table 8 show that blends of waste plastic with bio feedstocks (palm oil and soybean oil) convert well with a ZSM-5 containing FCC catalyst. Surprisingly, the medium-pore, 10-membered ZSM-5 catalyst can convert over 95 wt % of the plastic/bio feedstock blends at the typical FCC process conditions (Examples 7-1 through 7-3). The high conversions lead to very low yields of LCO and HCO. All these cases produced very high LPG and aromatics yields indicating this process can be used for production of feedstocks for polymer and chemical manufacturing without petroleum resources.

Addition of 10 wt % plastic to the palm oil caused only minor changes to the FCC unit performance in terms of the conversion and the yields of dry-gas and coke suggesting that coprocessing of waste plastic and bio feedstock is readily feasible (Example 7-1 vs. Example 7-2). While the 10 wt. % blending of low-density polyethylene (Plastic A) to palm oil led to only minor increases of coke and dry gas yields, significant positive increases in LPG yield (35 vs. 37 wt %) and total aromatics yield (76 vs. 81 wt % in the gasoline fraction) were observed. The significant increases in the LPG and aromatics yields from plastic containing blend was quite unexpected. This clearly indicates synergistic effects of the bio feedstock and plastic blend in providing increased yields of LPG and aromatics.

The 10 wt % plastic blending to the palm and soybean oil (Example 7-3) also showed consistent results of high LPG and aromatics production.

These results indicate the ZSM-5 catalyst made of medium pore size zeolite is a preferred catalyst for LPG olefin and aromatics production when converting a bio feed/plastic blend.

The high yield of LPG with this process is significant. The LPG and LPG olefins are desirable feedstocks for polyethylene and polypropylene production.

The high yield of aromatics with this process is also quite significant as these aromatics can be used of polystyrene or polyethylene terephthalate productions. Another surprising finding was the selectivity of the para-xylene relative to the total xylene. With the ZSM-5 catalyst, the xylene produced by this process is substantially para-xylene with about 61-70% para-xylene selectivity (relative to the total xylene production). Para-xylene is the most desirable xylene isomer for polyethylene terephthalate polymer manufacturing.

While this process is more suited for chemicals manufacturing, a portion of the products can be used to make premium gasoline fuel. The gasoline produced by this process has superior octane numbers of over 100 due to high aromatic contents in the gasoline fraction. The LCO and HCO yields are small due to high conversion.

Example 8—Direct Conversion of Plastic and Palm Oil Via FCC Using a USY Catalyst Laboratory tests of fluidized catalytic cracking (FCC) process were carried out with stable blends of plastic and palm oil (Examples 2-2 and 5-1) using an FCC catalyst made of USY zeolite and the results are summarized in Table 9.

feasible (Example 8-1 vs. 8-2). The 10 wt. % blending of low-density polyethylene (Plastic A) to palm oil had only minor effects on the product yields: LPG yield (19.5 vs. 21.3 wt %), gasoline yield (45.4 vs. 44.9 wt %), LCO (10.9 vs. 10.0 wt %) and HCO yields (3.2 vs. 3.3 wt %). However, a debit of gasoline octane number by 3 numbers (91 to 88) due to the paraffinic nature of the plastic was observed.

The 10 wt % plastic blending to the palm and soybean oil (Example 8-3) also showed consistent results of high LPG and gasoline production.

TABLE 9

Evaluation of Plastic and Palm Cofeeding to FCC with USY Catalyst

| Example No. | Example 8-1 | Example 8-2 | Example 8-3 |
|---|---|---|---|
| Feed | 100% Palm Oil (Example 2-1 Oil) | 10/90 wt % blend, LDPE/Palm Oil (Example 2-2 Blend) | 10/45/45 wt % blend, LDPE/Palm Oil/SBO (Example 5-1 Blend) |
| Cat/Oil, wt/wt | 6.00 | 6.00 | 6.00 |
| Conversion, wt %* | 85.88 | 86.67 | 85.88 |
| Yields | | | |
| Coke, wt % | 6.39 | 6.74 | 7.01 |
| Total Dry Gas, wt % | 2.17 | 2.22 | 2.24 |
| Hydrogen | 0.04 | 0.03 | 0.04 |
| Methane | 0.68 | 0.74 | 0.72 |
| Ethane | 0.50 | 0.50 | 0.52 |
| Ethylene | 0.96 | 0.95 | 0.97 |
| Total LPG, wt % | 19.45 | 21.27 | 19.88 |
| Propane | 1.52 | 1.56 | 1.55 |
| Propylene | 6.31 | 6.76 | 6.27 |
| n-Butane | 1.08 | 1.18 | 1.16 |
| Isobutane | 4.39 | 4.98 | 4.56 |
| C4 olefins | 6.15 | 6.79 | 6.35 |
| Gasoline, wt % | 45.39 | 44.85 | 45.52 |
| Composition of Gasoline Fraction | | | |
| n-Paraffins, wt % | 3.83 | 3.29 | 2.96 |
| Iso-paraffins, wt % | 13.63 | 19.47 | 18.03 |
| Aromatics, wt % | 62.63 | 57.56 | 58.13 |
| Naphthenes, wt % | 3.85 | 4.65 | 6.46 |
| Olefins, wt % | 16.03 | 14.98 | 13.68 |
| Benzene, wt % | 1.36 | 1.28 | 1.49 |
| Toluene, wt % | 8.01 | 6.90 | 7.12 |
| Ethylbenzene, wt % | 3.12 | 2.68 | 2.84 |
| m-xylene, wt % | 7.55 | 6.53 | 6.26 |
| p-xylene, wt % | 2.82 | 2.16 | 2.24 |
| o-xylene, wt % | 3.62 | 3.13 | 2.96 |
| p-xylene/total xylenes | 20% | 19% | 20% |
| LCO, wt % (430-650 F.) | 10.89 | 10.03 | 11.84 |
| HCO, wt % (650 F.+) | 3.23 | 3.30 | 2.28 |
| Gasoline Octane Number** | 90.81 | 87.98 | 91.85 |
| Aromatics, wt % of feed | 28.43 | 28.17 | 26.46 |
| C3=/C3 | 81% | 81% | 80% |
| C4=/C4 | 53% | 53% | 53% |
| C4=/C3= | 0.98 | 0.98 | 1.01 |

*Conversion - conversion of 430° F.$^+$ fraction to 430° F.$^-$
**Octane number, (R + M)/2, was estimated from detailed hydrocarbon GC of FCC gasoline.

The results in Table 9 show that blends of waste plastic with bio feedstocks (palm oil and soybean oil) convert well with a USY containing FCC catalyst. The overall conversions of the blends are 86-87% at the typical FCC process conditions (Examples 8-1 through 8-3). All these cases produced low dry-gas yield (undesirable product), and high LPG, gasoline and LCO yields (desirable product) indicating this process can be used for simultaneous production of feedstocks chemical manufacturing as well as premium renewable fuel without petroleum resources.

Addition of 10 wt % plastic to the palm oil caused only minor changes to the FCC unit performance in terms of the conversion and the yields of dry-gas and coke indicating that coprocessing of waste plastic and bio feedstock is readily With the USY catalyst, a synergistic effect of bio feedstock with plastic was not observed, nor the para-xylene selectivity observed with a ZSM-5 catalyst shown in Example 7-2. Compared with the ZSM-5 catalyst (Example 8.2 vs. Example 7.2), the USY catalyst produced much higher yields of LCO (10.0 vs. 1.4 wt %) and HCO (3.3 vs. 0.7 wt %). In addition, USY showed much higher coke selectivity (6.7 vs 1.7 wt %) and lower offgas yield (2.2 vs. 6.5 wt %). These results indicate that the USY catalyst made of large pore size zeolite is a preferred FCC catalyst for simultaneous production of chemical feedstock and premium fuel.

A portion of the products can be used to make premium fuel. The gasoline produced by this process has octane numbers of 91 to 88. Due to paraffinic nature of the plastic, the addition of polyethylene plastic causes some decrease in octane number. With refinery blending flexibility, this octane number debit can be compensated with minor blending adjustments.

The high yield of LPG with this process is significant. The LPG and LPG olefins are desirable feedstock for polyethylene and polypropylene production.

The high yield of aromatics with this process is also significant as these aromatics can be used in polystyrene or polyethylene terephthalate productions.

Example 9—Direct Conversion of Plastic and Tallow Via FCC Using ZSM-5 Catalysts Laboratory tests of fluidized catalytic cracking (FCC) process were carried out with stable blends of plastic and bio feedstock (Examples 3-2, 3-4, and 6-1) using an FCC catalyst made of ZSM-5 zeolite and the results are summarized in Table 10.

high conversion of over 95 wt % of the plastic/bio feedstock blends at the typical FCC process conditions (Examples 9-1 through 9-4). The high conversions lead to very low yields of LCO and HCO. All these cases produced very high LPG and aromatics yields indicating that this process can be used for production of feedstocks for polymer and chemical manufacturing without petroleum resources.

Addition of 10 wt % polyethylene or polypropylene plastic to the tallow caused only minor changes to the FCC unit performance in terms of the conversion and the yields of dry-gas and coke suggesting that coprocessing of waste plastic and bio feedstock is readily feasible (Example 9-1 vs. 9-2 and 9-3). Unlike the palm oil case shown in Example 7-2, the 10 wt. % blending of low-density polyethylene (Plastic A) and polypropylene (Plastic C) to tallow did not show any synergistic effects in LPG and aromatics yields. The LPG yield (36.5 vs. wt %) and total aromatics yield (80.6 vs. 80.3-80.6 wt % in the gasoline fraction) were similar for the plastic co-feeding cases.

TABLE 10

Evaluation of Plastic and Tallow Cofeeding to FCC with ZSM-5 Catalyst

| Example No. | Example 9-1 | Example 9-2 | Example 9-3 | Example 9-4 |
|---|---|---|---|---|
| Feed | 100% Tallow (Example 3-1) | 10/90 wt % blend, LDPE/Tallow (Example 3-2) | 10/90 wt % blend, PP/Tallow (Example 3-4) | 10/45/45 wt % blend, LDPE/Tallow/SBO (Example 6-1) |
| Cat/Oil, wt/wt | 6.0 | 6.0 | 6.0 | 6.0 |
| Conversion, wt %* | 97.87 | 98.04 | 96.67 | 95.12 |
| Yields | | | | |
| Coke, wt % | 0.87 | 1.99 | 1.01 | 1.40 |
| Total Dry Gas, wt % | 6.11 | 6.15 | 6.13 | 6.09 |
| Hydrogen | 0.06 | 0.06 | 0.06 | 0.06 |
| Methane | 0.25 | 0.27 | 0.30 | 0.27 |
| Ethane | 0.25 | 0.27 | 0.29 | 0.30 |
| Ethylene | 5.56 | 5.55 | 5.49 | 5.46 |
| Total LPG, wt % | 36.54 | 36.36 | 35.52 | 31.89 |
| Propane | 3.26 | 3.57 | 3.48 | 3.12 |
| Propylene | 16.45 | 15.96 | 15.60 | 14.21 |
| n-Butane | 1.09 | 1.25 | 1.19 | 1.05 |
| Isobutane | 1.56 | 1.77 | 1.71 | 1.39 |
| C4 olefins | 14.18 | 13.81 | 13.55 | 12.12 |
| Gasoline, wt % | 40.71 | 41.68 | 42.09 | 44.08 |
| Composition of Gasoline Fraction | | | | |
| n-Paraffins, wt % | 1.74 | 1.40 | 1.52 | 1.36 |
| Iso-paraffins, wt % | 4.68 | 5.52 | 5.32 | 4.38 |
| Aromatics, wt % | 81.47 | 80.57 | 80.32 | 85.24 |
| Naphthenes, wt % | 2.14 | 2.29 | 2.36 | 1.65 |
| Olefins, wt % | 9.38 | 10.10 | 10.05 | 6.78 |
| Benzene, wt % | 7.52 | 7.49 | 6.67 | 8.36 |
| Toluene, wt % | 27.99 | 27.02 | 25.61 | 29.86 |
| Ethylbenzene, wt % | 6.07 | 6.17 | 6.01 | 5.94 |
| m-xylene, wt % | 3.38 | 6.43 | 6.60 | 6.82 |
| p-xylene, wt % | 20.14 | 17.85 | 17.76 | 16.62 |
| o-xylene, wt % | 1.66 | 2.29 | 2.38 | 2.26 |
| p-xylene/total xylenes | 67% | 67% | 66% | 65% |
| LCO, wt % (430-650 F.) | 1.50 | 1.38 | 2.22 | 2.85 |
| HCO, wt % (650 F.+) | 0.63 | 0.58 | 1.11 | 2.03 |
| Octane Number** | 103.30 | 104.55 | 103.66 | 103.07 |
| Aromatics, wt % of feed | 32.80 | 33.58 | 33.81 | 37.58 |
| C3=/C3 | 83% | 82% | 82% | 82% |
| C4=/C4 | 84% | 82% | 82% | 83% |
| C4=/C3= | 0.86 | 0.87 | 0.87 | 0.85 |

*Conversion - conversion of 430° F.$^+$ fraction to 430° F.$^-$
**Octane number, (R + M)/2, was estimated from detailed hydrocarbon GC of FCC gasoline.

The results in Table 10 show that blends of waste plastic with bio feedstocks (tallow and soybean oil) convert well with a ZSM-5 containing FCC catalyst. Similar to the co-processing with palm oil, ZSM-5 catalyst showed very The 10 wt % plastic blending to the tallow and soybean oil (Example 9-4) also showed consistent results of high LPG and aromatics production, as well as high para-xylene selectivity.

The high yields of LPG and aromatics shown in Table 10 indicate again that the ZSM-5 catalyst made of medium pore size zeolite is a preferred catalyst for LPG olefin and aromatics production from a blend of plastic and bio feedstock such as tallow. With the ZSM-5 catalyst, the xylene produced by this process is substantially para-xylene with about 65-67% para-xylene selectivity (relative to the total xylene production).

Example 10—Direct Conversion of Plastic and Tallow Via FCC Using USY Catalysts

Laboratory tests of fluidized catalytic cracking (FCC) process were carried out with stable blends of plastic and tallow bio feedstocks (Examples 3-2, 3-4, 6-1) using an FCC catalyst made of USY zeolite and the results are summarized in Table 11.

ing that this process can be used for simultaneous production of feedstocks for chemical manufacturing as well as premium fuel without petroleum resources.

Addition of 10 wt % plastic to the tallow caused only minor changes to the FCC unit performance in terms of the conversion and the yields of dry-gas and coke indicating that coprocessing of waste plastic and bio feedstock is readily feasible (Example 10-1 vs. 10-2 and 10-3). The 10 wt. % blending of low-density polyethylene (Plastic A) or polypropylene (Plastic C) to tallow increased the LPG yield slightly (20.1 vs. 21.6-22.6 wt %) while having only minor effects on the other product yields: gasoline yield (44.6 vs. 43.6-44.3 wt %), LCO (10.5 vs. 10.2-11.0 wt %) and HCO yields (3.5 vs. 3.2-3.3 wt %). No debit in gasoline octane number was observed with co-feeding of polyethylene and

TABLE 11

Evaluation of Plastic and Tallow Cofeeding to FCC with USY Catalyst

| Example No. | Example 10-1 | Example 10-2 | Example 10-3 | Example 10-4 |
|---|---|---|---|---|
| Feed | 100% Tallow (Example 3-1) | 10/90 wt % blend, LDPE/Tallow (Example 3-2) | 10/90 wt % blend, PP/Tallow (Example 3-4) | 10/45/45 wt % blend, LDPE/Tallow/SBO (Example 6-1) |
| Cat/Oil, wt/wt | 6.0 | 6.0 | 6.0 | 6.0 |
| Conversion, wt %* | 85.99 | 86.51 | 85.86 | 85.43 |
| Yields | | | | |
| Coke, wt % | 6.18 | 6.98 | 6.19 | 6.79 |
| Total Dry Gas, wt % | 2.20 | 2.31 | 2.21 | 2.42 |
| Hydrogen | 0.03 | 0.03 | 0.03 | 0.04 |
| Methane | 0.70 | 0.79 | 0.73 | 0.78 |
| Ethane | 0.51 | 0.52 | 0.51 | 0.57 |
| Ethylene | 0.95 | 0.97 | 0.94 | 1.03 |
| Total LPG, wt % | 20.10 | 22.65 | 21.63 | 20.36 |
| Propane | 1.56 | 1.62 | 1.54 | 1.64 |
| Propylene | 6.44 | 7.16 | 6.80 | 6.41 |
| n-Butane | 1.13 | 1.23 | 1.14 | 1.22 |
| Isobutane | 4.73 | 5.34 | 5.12 | 4.62 |
| C4 olefins | 6.24 | 7.31 | 7.03 | 6.47 |
| Gasoline, wt % | 44.64 | 43.55 | 44.27 | 44.44 |
| Composition of Gasoline Fraction | | | | |
| n-Paraffins, wt % | 3.29 | 3.19 | 3.47 | 3.07 |
| Iso-paraffins, wt % | 19.47 | 19.07 | 18.97 | 19.60 |
| Aromatics, wt % | 57.56 | 58.02 | 54.96 | 59.78 |
| Naphthenes, wt % | 4.65 | 4.85 | 5.67 | 5.63 |
| Olefins, wt % | 14.98 | 14.63 | 16.49 | 11.03 |
| Benzene, wt % | 1.28 | 1.27 | 1.28 | 2.40 |
| Toluene, wt % | 6.90 | 7.05 | 6.88 | 8.89 |
| Ethylbenzene, wt % | 2.68 | 2.82 | 2.48 | 2.93 |
| m-xylene, wt % | 6.53 | 6.70 | 6.40 | 6.69 |
| p-xylene, wt % | 2.16 | 2.42 | 2.34 | 2.33 |
| o-xylene, wt % | 3.13 | 3.20 | 3.04 | 3.18 |
| p-xylene/total xylenes | 18% | 20% | 20% | 19% |
| LCO, wt % (430-650 F.) | 10.54 | 10.20 | 10.98 | 11.01 |
| HCO, wt % (650 F.+) | 3.47 | 3.29 | 3.16 | 3.56 |
| Octane Number** | 87.98 | 87.85 | 92.25 | 88.04 |
| Aromatics, wt % of feed | 25.69 | 25.27 | 24.33 | 26.57 |
| C3=/C3 | 81% | 82% | 82% | 80% |
| C4=/C4 | 52% | 53% | 53% | 53% |
| C4=/C3= | 0.97 | 1.02 | 1.03 | 1.01 |

*Conversion - conversion of 430° F.+ fraction to 430° F.−
**Octane number, (R + M)/2, was estimated from detailed hydrocarbon GC of FCC gasoline.

The results in Table 11 show that blends of waste plastic with bio feedstocks (tallow and soybean oil) convert well with a USY containing FCC catalyst. The overall conversions of the blends are 85-87% at the typical FCC process conditions (Examples 10-1 through 10-4). All these cases produced low dry-gas yield (undesirable product), and high LPG, gasoline and LCO yields (desirable product) indicata 2 number of gasoline octane number increase with co-feeding of polypropylene (88.0 vs. 87.9 vs. 92.3) was observed.

These results indicate that the USY catalyst made of large pore size zeolite is a preferred catalyst for simultaneous production of chemical feedstock and premium renewable fuels.

As used in this disclosure the word "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the composition. The phrase "consisting of" or "consists of" is intended as a transition meaning the exclusion of all but the recited elements with the exception of only minor traces of impurities.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise that as specifically described without actually departing from the spirit and scope of the present invention as defined by the appended claims.

What is claimed is:

1. A process for preparing a stable blend of plastic and a bio feedstock comprising:
   (a) mixing a bio feedstock and a plastic comprising polyethylene and/or polypropylene together and while mixing heating the mixture in the range of about 250 to 550 F and above the melting point of the plastic to form a homogeneous liquid blend with the amount of plastic in the liquid blend comprising less than 20% by weight of the mixture; and
   (b) cooling the plastic melt and bio feedstock liquid blend to a temperature below the melting point of the plastic.

2. The process of claim 1, wherein the cooling in (b) is conducted together with continuous stirring.

3. The process of claim 1, wherein the heating is conducted at a temperature of 250-550° F. with a residence time of 5-240 minutes at a final heating temperature.

4. The process of claim 1, wherein the cooling is continued until ambient temperature is reached.

5. The process of claim 1, wherein the amount of plastic in the blend comprises from 1-10 wt. % of the blend.

6. The process of claim 1, wherein the plastic comprises low density polyethylene.

7. The process of claim 1, wherein the plastic comprises high density polyethylene.

8. The process of claim 6, wherein the blend comprises from 1-10 wt. % of the low density polyethylene.

9. The process of claim 7, wherein the blend comprises from 1-10 wt. % of the high density polyethylene.

10. The process of claim 1, wherein the plastic comprises polypropylene having an average molecular wight, $M_w$, in the range of 5,000 to 150,000.

11. The process of claim 1, wherein the plastic comprises polypropylene having an average molecular wight, $M_w$, in the range of 150,000 to 400,000.

12. The process of claim 1, wherein the bio feedstock comprises triglycerides, fatty acids, plant-derived oils, animal-derived fats and oils or a mixture thereof.

13. The process of claim 12, wherein the plant-derived oils comprise palm oil, canola oil, corn oil, soybean oil or a mixture thereof.

14. The process of claim 12, wherein the bio feedstock comprises tallow, lard, schmaltz, or fish oil.

15. The process of claim 1, wherein the bio feedstock comprises palm oil, tallow, soybean oil or a mixture thereof.

16. The process of claim 1, wherein the bio feedstock comprises a mixture of palm oil and soybean oil.

17. The process of claim 1, wherein the bio feedstock comprises a mixture of tallow and soybean oil.

18. The process of claim 1, wherein the bio feedstock comprises biomass pyrolysis oil.

19. The process of claim 1, wherein the bio feedstock comprises a bio feedstock or mixed bio feedstock having an iodine number of 95 or less.

20. The process of claim 19, wherein the iodine number is 91 or less.

21. The process of claim 1, wherein a stream of petroleum feedstock comprising LCO or gasoline is added to reduce the blend viscosity.

22. The process of claim 21, wherein the petroleum feedstock comprises 0-50 wt % of the blend.

23. The process of claim 1, wherein the plastic in the blend comprises finely dispersed micron size particles.

24. The process of claim 1, wherein the blend comprises waste plastic.

* * * * *